Oct. 4, 1966    R. G. NOWJAK    3,276,133
SINE TEMPLATE
Filed Jan. 21, 1963
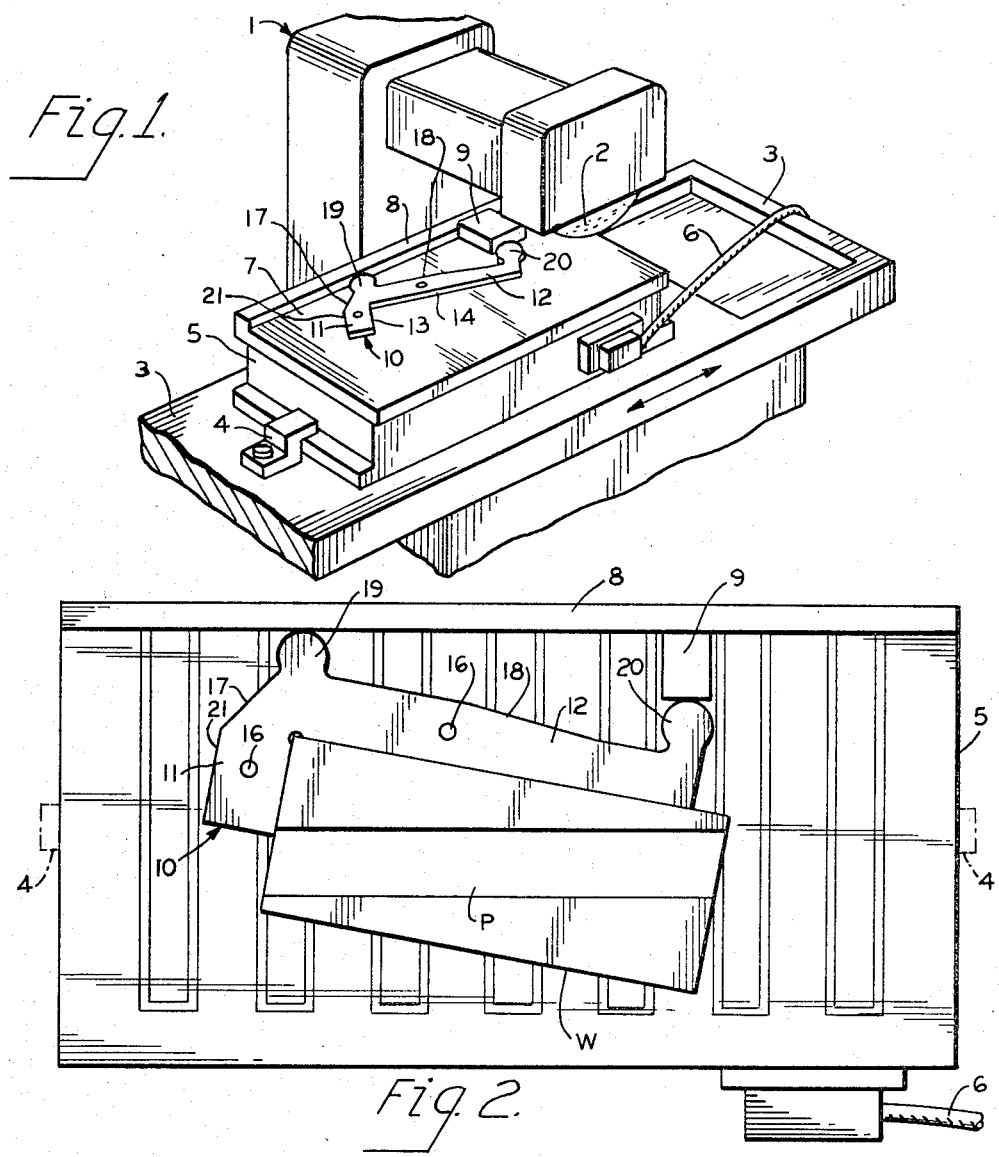
Fig. 1.
Fig. 2.
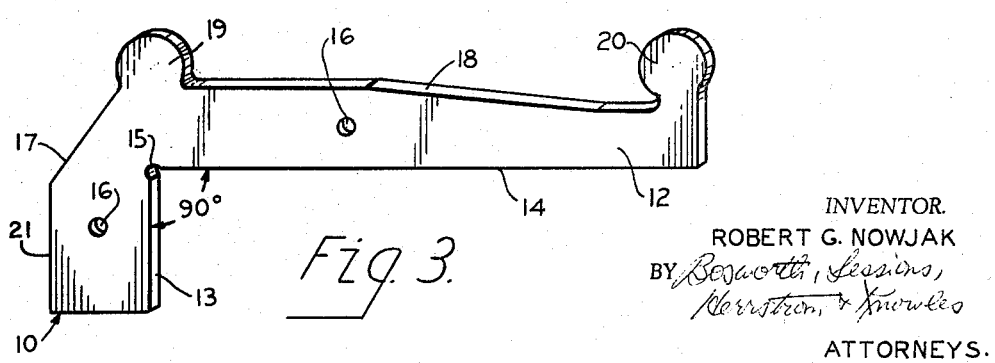
Fig. 3.
INVENTOR.
ROBERT G. NOWJAK
BY Bosworth, Sessions,
Herrstrom, & Knowles
ATTORNEYS.

United States Patent Office 3,276,133
Patented Oct. 4, 1966

3,276,133
SINE TEMPLATE
Robert G. Nowjak, 1178 Mayfield Ridge Road,
Mayfield Heights, Ohio
Filed Jan. 21, 1963, Ser. No. 252,921
1 Claim. (Cl. 33—174)

This invention relates to a machinist's accessory, more particularly a metal template of the nature of a sine bar ("sine template").

Sine bars are well known to mechanists and others whose work requires the precise angling of workpieces. They are sometimes built into angle tables as, for example, in the case of the angle table of Robbins Patent 2,111,299. They are occasionally incorporated in heavy machine tools, particularly if the tool is one intended for the mass production of metal parts. In practically all such cases, the sine bar or portion corresponding thereto is three-dimensional in the sense that its dimensions are substantial, not only as regards length and breadth but as regards height as well.

The present invention has to do with a device which like a sine bar, has substantial dimensions as regards both length and breadth but which, unlike a sine bar, has very little height, so little, in fact, that it can be thought of as essentially two-dimensional. In certain respects it resembles a machinist's square more than it does a sine bar, notably in that it is characterized by a first leg, a second leg and an included angle of 90° in which, if desired, a workpiece may be accommodated. Taken with the fact that the height is little greater than the minimum dictated by a desire for rigidity, the latter feature suggests a template, thus giving rise to the name "sine template."

Actually, the low height of the device is an important practical advantage, particularly when the workpiece is shallow, for the reason that an accessory of this kind with a height comparable to that of a thin metal template can easily remain out of the way of the grinding wheel, cutting tool or other functioning element of the instrumentality with which it is to be used. Its low height also lends itself to cooperation with a variety of gripping devices such as brackets, clamps and electro-magnets of the kind commonly incorporated in magnetic chucks. In and of itself the sine template of the present invention is simple, sturdy and light in weight, yet capable of accomplishing much of what in the past it has been possible to do only with the aid of three-dimensional sine bars and more complicated structures.

Other features, objects and advantages of the invention will be apparent from the following description and from the accompanying drawings, in which:

FIGURE 1 is an isometric representation of a grinding machine mounting a magnetic chuck for holding a ferrous metal template in position.

FIGURE 2 is a top plan, on a larger scale, of the chuck and template of FIGURE 1, together with the workpiece.

FIGURE 3 is a perspective of a representative template on a scale approaching full scale.

Grinding machine 1, seen in FIGURE 1, includes the usual grinding wheel 2 and reciprocable table 3. Mounted on the latter as by means of brackets 4 is a magnetic chuck 5 coupled by an electrical cable 6 to a suitable source of electric current. The top face 7 of chuck 5 is flat except for an upstanding rail 8 along one side thereof. When the template is in use, a steel gauge block 9 and the template itself bear against rail 8 in the manner shown in FIGURE 2, being held in place by magnetic forces when chuck 5 is energized.

Template 10 consists among other things of a short leg 11 and a long leg 12 formed integrally with and extending at right angles to each other. Thus inner edge portions 13 and 14 of legs 11 and 12, respectively, define an angle of 90°; see FIGURE 3. Where inner edge portions 13 and 14 impinge on each other, the corner is relieved as at 15 (FIGURES 2 and 3) to facilitate snug engagement of workpiece W. Optionally, positioning holes 16 may be provided in legs 11 and 12, although with a chuck of the kind shown in FIGURES 1 and 2 positioning holes are not ordinarily required. Similarly, outer edge portions 17 and 18 of legs 11 and 12, respectively, need not necessarily be formed as shown, particularly in the stretches between their ends.

However, outer edge portion 18, whatever its shape between its ends, will normally be characterized by two substantially semi-circular extensions 19 and 20. The term "substantially semi-circular" is intended to suggest that although the circumferences of extensions 19 and 20 are not full circles, the subtending angles measure at least 3.14 radians. It will be noted that in the template shown in the drawings, extension 19 is formed as a circular arc of approximately 200° and extension 20 is formed as a circular arc of approximately 250°. The plane of the inner edge portion 13 of leg 11 passes through extension 19 and extension 19 has a radius substantially less than the width of leg 11. The center-to-center distance between extensions 19 and 20 will ordinarily measure exactly 3", 4", 5", 6", 7", 8" or the like and, while short of the overall length, this is the nominal length of the template. Regardless of the length of gauge block 9, the distance between the point of tangency of rail 8 and extension 19 on one hand and the point of tangency of the gauge block and extension 20 on the other will always correspond exactly to this nominal length.

The degree to which workpiece W is angled in relation to the longitudinal axis of chuck 5 obviously depends on the length of gauge block 9; however, it depends also on the accuracy with which the template is made, particularly as regards inner edge portions 13 and 14 of legs 11 and 12 and the shape and location of extensions 19 and 20 on leg 12. A high degree of accuracy is necessary if the intended path of travel P of grinding wheel 2 across the surface of workpiece W is to be accurately delineated. Because of these requirements for accuracy, all of the surfaces of template 10 other than the ends of legs 11 and 12 and the stretches between the ends of sides 17 and 18 should be finished to close tolerances. Leg 11 includes an outer edge portion 21 opposed to the inner edge portion 13. The outer edge portion 17 tapers from the opposed outer edge portion 21 and intersects extension 19. The tapered outer edge portion 17 permits the extension 19 to engage rail 8 through more than 90° of the periphery of extension 19.

It is evident that template 10 should be of magnetic material such as steel if the template is to be used with a magnetic chuck; however, if it is to be held in place in some other way, as by clamping, it may if desired be of brass or other non-magnetic material. In use, it may be reversed end for end so that extension 19 will be at the right and extension 20 will be at the left, seen as in FIGURE 2. Its low height, not usually more than ⅛ inch, is of advantage in that the template thus can be out of the way of grinding wheel 2, even when workpiece W is of shallow altitude.

It is intended that the patent shall cover, by summarization in appended claim, all features of patentable novelty residing in the invention.

What is claimed is:

A sine template comprising a thin, flat, essentially two-dimensional generally L-shaped metal member characterized by (a) a first leg having opposed inner and outer edge portions, (b) a second leg extending at an angle thereto, (c) two substantially semi-circular extensions on said second leg on the edge thereof away from the included angle, neither of which projects above the plane of said L-shaped member on either side thereof, and (d) cut-away portions on each of said legs adjoining said substantially semi-circular extension, the plane of said opposed inner edge portion of said first leg passing through one of said extensions, said one of said extensions having a radius substantially less than the width of said first leg, said first leg having a second outer edge portion tapering from said opposed outer edge portion and intersecting said one of said extensions.

References Cited by the Examiner

UNITED STATES PATENTS

| | | | |
|---|---|---|---|
| 1,169,928 | 2/1916 | Commons | 33—174 X |
| 1,551,995 | 9/1925 | Lovenston | 33—174 |
| 2,446,562 | 8/1948 | Trbojevich | 33—174 |

OTHER REFERENCES

Article: A. Berber, American Machinist, September 7, 1922, page 385.

LEONARD FORMAN, *Primary Examiner.*

SAMUEL S. MATTHEWS, *Examiner.*